United States Patent
Helsley

[15] 3,676,432
[45] July 11, 1972

[54] 11,12-DIHYDRODIBENZ[B,F]AZOCIN-6(5H)-ONES

[72] Inventor: Grover Cleveland Helsley, Richmond, Va.

[73] Assignee: A. H. Robins Company, Incorporated, Richmond, Va.

[22] Filed: Aug. 31, 1970

[21] Appl. No.: 68,548

[52] U.S. Cl. .................... 260/239.3 T, 424/244, 424/274
[51] Int. Cl. ............................................. C07d 41/08
[58] Field of Search ............................... 260/239.3 T

[56] References Cited

UNITED STATES PATENTS 3,454,561  7/1969  Schmutz et al. ............... 260/239.3 T

FOREIGN PATENTS OR APPLICATIONS 1,817,016  8/1969  Germany .................. 260/239.3 T

OTHER PUBLICATIONS

Monro et al. " J. Med. Chem." Vol. 6 pages 255– 261 (1963)
Sowinski et al. " Arzneimittel–Forsch" No. 5 pages 117– 119 (1964)

Primary Examiner—Henry R. Jiles
Assistant Examiner—Robert T. Bond
Attorney—G. William King and Norman D. Dawson

[57] ABSTRACT

5-(1-Hydrocarbon-3-pyrrolidinyl)-11,12-(dihydro- and dehydro)dibenz[b,fe[azocin-6(5H)-ones exhibiting antidepressant activity are disclosed.

4 Claims, No Drawings

11,12-DIHYDRODIBENZ[B,F]AZOCIN-6(5H)-ONES

The present invention relates to 11,12-(dihydro- and dehydro)dibenz[b,fe[azocin-6(5H)-ones and is more particularly concerned with 5-(1-hydrocarbon-3-pyrrolidinyl)-11,12-(dihydro- and dehydro)dibenz[b,f]-azocin-6(5H)-ones, compositions thereof and methods of making and using same.

The compounds of the invention are represented by the following structural formula:

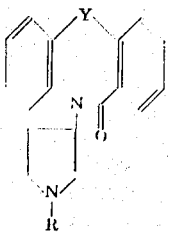

Formula I wherein;
R is selected from the group consisting of hydrogen, loweralkyl and phenyllower-alkyl,
Y is selected from —CH$_2$—CH$_2$ and —CH = CH, and non-toxic pharmaceutically acceptabllly acid addition salts thereof.

The novel compounds of the invention were administered to mice intraperitoneally and the effectiveness of the compounds in blocking the depressant effects which are induced in mice by intravenous administration of 2-oxo-3-isobutyl-9,10-dimethoxy-1,2,3,4,6,7-hexahydro-11bh-benzo[a]quinolizine (tetrabenazine) was determined. The procedure used was a modification of the procedure given by Englehardt, E. L., et al., J. Med. Chem. 11 (2): 325(1968). Among the novel compounds of the present invention which have been shown to block the depressant activity of tetrabenazine when administered intraperitoneally to mice, the compounds of Examples 1, 2, and 3; namely, 5-(1-benzyl-3-pyrrolidinyl)-11,12-dihydrobenz[b,f]azocin-6(5H)-one, 11,12-dihydro-5-(3-pyrrolidinyl)dibenz[b,f]azocin-6(5H)-one, and 5-(1 methyl-3-pyrrolidinyl)-11,12-dihydrobenz[b,f]azocin-6(5H)-one are preferred. The ED$_{50}$'s of Example 1, 2 and 3 are 11.0, 14.5 and 11.7 mg./kg. respectively as determined by the method of Litchfield and Wilcoxon, J. Pharmacol. Exp. Therap. 96, 99 (1949).

It is, therefore, an object of the present invention to provide novel 5-(1-hydrocarbon-3-pyrrolidinyl)-11,12-(dihydro- and dehydro)dibenz[b,fe[azocin-6-(5H)-ones. A further object is to provide novel 5-(1-hydrocarbon-3-pyrrolidinyl)-11,12-(dihydro- and dehydro)dibenz[b,f]azocin-6(5H)-ones having a high degree of antidepressant activity. A still further object is to provide methods for producing the novel compounds, pharmaceutical compositions containing said compounds as active ingredient and methods for the utilization thereof. Additional objects will be apparent to one skilled in the art and still other objects will be apparent hereinafter.

The term "lower-alkyl" as used in the specification and claims includes straight and branched chain radicals of up to eight carbon atoms inclusive and is exemplified by such groups as methyl, ethyl, propyl, isopropyl, butyl, isobutyl, tertiary butyl, amyl, isoamyl, hexyl, heptyl, octyl, and the like.

The term "phenyllower-alkyl" includes groups such as benzyl, phenethyl, methylbenzyl, phenylpropyl, and the like.

The compounds of the invention are most conveniently employed in the form of non-toxic acid addition salts. Such salts have improved water solubility over the free base. Although the non-toxic salts are preferred, any salt may be prepared for use as a chemical intermediate, as in the preparation of another acid addition salt suitable for administration to an animal body for the desired physiological effect thereof. Appropriate acid addition salts are those derived from inorganic acids such as hydrochloric, hydrobromic, sulfuric and phosphoric, and organic acids such as acetic, citric, lactic, maleic, oxalic, fumaric and tartaric. The preferred addition salt is the hydrochloride. The acid addition salts of the product compounds are conventionally prepared by reaction of the basic compounds with the acid, either or both of which may be in the form of ether, alcohol or acetone solutions.

The starting materials used in preparing the novel compounds of Formula I are the compounds of Formula II, wherein Y is defined above, namely, 11,12-dihydrodibenz[b,f]6(5H)-one and 11,12-dehydrodibenz[b,f]6(5H)-one which are prepared according to the procedures described in J. Med. Chem. 6, 258 (1963) and Arzneimittel-Forsch 5, 117-119(1964) respectively.

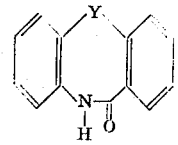

Formula II

The preparation of the novel 5-(1-hydrocarbon-3-pyrrolidinyl)-11,12-(dihydro- and dehydro)dibenz[b,f]azocin-6(5H)-ones (I) may be accomplished by mixing and reacting a selected 1-hydrocarbon-3-pyrrolidinol ester (III) with a 11,12-(dihydro- and dehydro) dibenz[b,f]azocin-6(5H)-one (II). The reaction sequence is illustrated by the following:

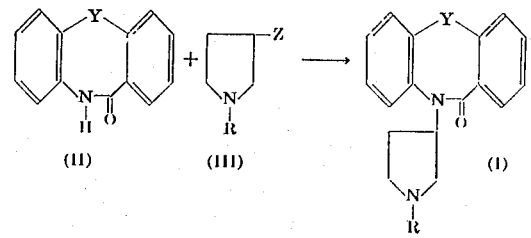

wherein Y and R are as defined above (R cannot be hydrogen) and Z is halogen, preferably bromine and chlorine or an arylsulfonyloxy group. When it is desired to prepare a compound of Formula I wherein R is hydrogen, said compound is prepared by the further step of hydrogenolysis as illustrated by the following:

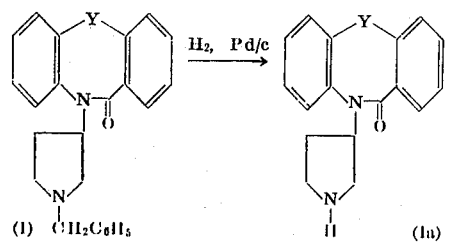

The hydrogen atom of the secondary amine group of the 5-(3-pyrrolidinyl)-11,12-(dihydro- and dehydro)dibenz[b,f]-6(5H)-ones (Ia) exhibits all the reactive characteristics of a secondary group and enters readily into conventional halogen displacement reactions. Thus, additional novel compounds of Formula I can be readily prepared by reacting a compound of Formula Ia with a reactive halogen compound as shown by the following:

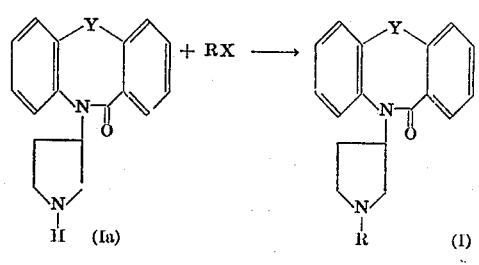

wherein R is as defined (R≠H) and X is a halogen atom, preferably bromine or chlorine.

A general method for the preparation of the novel compounds of Formula I is as follows:

A stirred suspension of a metal hydride or a metal amide as, for example, sodium hydride, in a suitable solvent such as dimethylformamide is treated with a solution of an 11,12dihydrodibenz[ ]azocin-6(5H)-one (II) or a solution of an 11,12-dehydrodibenz[b,f]azocin-6(5H)-one (II) in dimethylformamide and the stirred mixture is heated at a temperature of from about 30° C. to about 70° C., preferably at about 40° to 50° C. until the evolution of gas ceases. A solution of the 1-hydrocarbon-3-pyrrolidinol ester (III) in dimethylformamide is added slowly to the stirred mixture which is then heated at a temperature of from about 50° C. to about 100° C., preferably at about 70° to 80° C. for a period of from about 4 hours to about 16 hours. The cooled reaction mixture is diluted with water and the solution extracted several times with a suitable organic solvent such as benzene. The combined extracts are washed with water, dried over a suitable inorganic drying agent, and the solvent evaporated from the dry solution. The residual material is purified by crystallization from a suitable solvent if it is a solid or it is converted to a suitable acid addition salt which is purified by crystallization.

The following examples are given by way of illustration only and are not to be construed as limiting the invention thereto.

EXAMPLE 1

5-(1-Benzyl-3-Pyrrolidinyl)-11,12-Dihydrodibenz[b,f]Azocin-6(5H)-One Oxalate Hydrate To a stirred suspension of 2.4 g. (0.10 mole) of sodium hydride in 60 ml. of dimethylformamide was added slowly a warm solution of 19.0 g. (0.085 mole) of 11,12-dihydrodibenz[b,f]azocin-6(5H)-one in 300 ml. of dimethylformamide. The mixture was stirred at 40°–50° C. until the evolution of gas ceased (ca. 30 minutes). To the reaction flask was then added slowly 27.0 g. (0.085 mole) of the benzenesulfonate ester of 1-benzyl-3-pyrrolidinol dissolved in 50 ml. of dimethylformamide. The stirred mixture was heated at 70°–80° C. for 16 hours. The cooled mixture was treated with 700 ml. of water, extracted with benzene and the combined benzene extracts were washed with water, dried over magnesium sulfate and the benzene evaporated from the dried solution at reduced pressure. The residual oil was taken up in isooctane from which 2.0 g. of crystalline material separated and was identified as unreacted 11,12 -dihydrodibenz [b,f]azocin-6 (5H)-one. The isooctane filtrate was evaporated and the residual oil was converted to an amorphous hydrochloride salt which weighed 26.0 g. (71 percent yield). The amorphous hydrochloride salt was converted to the free base with sodium bicarbonate which was treated with oxalic acid to give the oxalate salt. The oxalate salt melted at 85°–89° C. after it was recrystallized from a methyl ethyl ketone-isopropyl ether mixture.

Analysis:
Calculated for C$_{28}$H$_{30}$N$_2$O$_6$:  C,68.55; H,6.16; N,5.71
Found:  C,68.96; H,6.02, N,5.79

EXAMPLE 2

5-(1-Methyl-3-Pyrrolidinyl)-11,12-Dihydrodibenz[b,f]Azocin-6(5H)-One

To a stirred suspension of 1.7 g. (0.070 mole) of sodium hydride in 60 ml. of dimethylformamide was added slowly a solution of 13.0 g. (0.058 mole) of 11,12-dihydrodibenz[b,f]azocin-6(5H)-one in 125 ml. of dimethylformamide. The mixture was stirred at 40°–50° C. until the evolution of gas ceased (ca. 15 minutes). To the reaction flask was then added 14.0 g. (0.058 mole) of the benzenesulfonate ester of 1-methyl-3-pyrrolidinol dissolved in 25 ml. of dimethylformamide. The stirred mixture was heated at 60°–70° C. for 8 hours. The cooled mixture was treated with 500 ml. of water and extracted with benzene and the combined benzene extracts were washed with water, dried over magnesium sulfate and the solvent evaporated from the dried solution at reduced pressure. The residual oil crystallized on trituration with isooctane and the solid was recrystallized from an isooctane-isopropyl ether mixture yielding 7.5 g. (42 percent) of white product which melted at 116°–120° C.

Analysis:
Calculated for C$_{20}$H$_{22}$N$_2$O:  C,78.39; H,7.24; N,9.14
Found:  C,78.36; H,7.21; N,8.87

EXAMPLE 3

11,12-Dihydro-5-(3-Pyrrolidinyl)dibenz[b,f]Azocin-6(5H)-One

A solution of 20.0 g. of 5-(1-benzyl-3-pyrrolidinyl)-11,12-dihydrodibenz[b,f]6(5H)-one hydrochloride in 200 ml. of 95 percent ethanol containing ca. 5 g. of 10 percent palladium-on-charcoal catalyst and was shaken in a hydrogen atmosphere at 60°–70° C. until one equivalent of hydrogen was absorbed. The cooled suspension was filtered and the filtrate concentrated at reduced pressure. The viscous residual oil was treated with 10% sodium carbonate solution and the basic solution extracted with benzene. The combined benzene extracts were washed with water, dried over magnesium sulfate and the solvent evaporated from the dried solution. The residual oil crystallized on trituration with isooctane and weighed 8.1 g. (58 percent yield); it melted at 115°–119° C. The product melted at 118°–120° C. after it was recrystallized from an isooctane-isopropyl ether mixture.

Analysis:
Calculated for C$_{19}$H$_{20}$N$_2$O:  C,78.04; H,6.90; N,9.58
Found:  C,78.09; H,6.96; N,9.50

EXAMPLE 4

5-(1-Phenethyl-3Pyrrolidinyl)-11,12-dihydrobenz[b,f]Azocin-6(5H)-One Hydrochloride A mixture of 11.0 g. (0.037 mole) of 11,12-dihydro-5-(3-Pyrrolidinyl)dibenz[b,f]azocin-6-(5H)-one, 7.4 g. (0.040 mole) of phenethyl bromide, 15 g. potassium carbonate and 150 ml. of dry toluene is stirred at reflux for 16 hours and treated with 100 ml. of water. The organic layer is separated, washed with water, dried over magnesium sulfate, filtered and the solvent evaporated. The residual oil is dissolved in ethyl ether, the solution filtered and the filtrate evaporated leaving a residue which is converted to the hydrochloric acid salt as in Example 1.

EXAMPLE 5

5-(1-Benzyl-3-Pyrrolidinyl)-11,12-Dehydrobenz[b,f]Azocin-6-(5H)-One

Utilizing the procedure of Example 1, 11,12-dehydrodibenz[b,f]azocin-(5H)-one is reacted with the benzene sulfonate ester of 1-benzyl-3-pyrrolidinol to produce the free base of the above title compound.

EXAMPLE 6

5-(1-Methyl-3Pyrrolidinyl)-11,12Dehydrodibenz[b,f]Azocin-6(5H)-One

Utilizing the procedure of Example 2, 11,12-dehydrodibenz[b,f]azocin-(5H)-one is reacted with the benzenesulfonate ester of 1-methyl-3-pyrrolidinol to produce the title compound.

EXAMPLE 7

5-(3-Pyrrolidinyl)-11,12-Dehydrodibenz[b,f]Azocin-6(5H)-One

Utilizing the procedure of Example 3,5-(1-benzyl-3-pyrrolidinyl)-11,12-dehydrodibenz[b,f]azocin-6(5H)-one is debenzylated to product the title compound.

EXAMPLE 8

5-(1-Phenylpropyl-3Pyrrolidinyl-11,12-Dehydrodibenz[b,f]Azocin-6(5H)-One

Utilizing the procedure of Example 4, 5-(3-pyrrolidinyl)-11,12-dehydrodibenz[b,f]azocin-6(5H)-one is reacted with phenyl propyl bromide to produce the title compound.

Effective quantities of any of the foregoing pharmacologically active compounds of Formula I may be administered to a living animal body for therapeutic purposes according to usual modes of administration and in usual forms, such as orally in solutions, emulsions, suspensions, pills, tablets and capsules.

Amphetamines and barbiturates are frequently useful in depression therapy as well as tranquilizers. In particular, the use of tranquilizing drugs as with sedatives and the amphetamine group have shown valuable results, especially with disturbed and agitated cases of depression. This invention is, therefore, intended to encompass the combined use of the foregoing with the antidepressant compounds hereof, as well as with other drugs used adjunctively in depression control and treatment. Thus, the compounds of this invention may be administered alone or in combination with other pharmacologically effective agents such as psychomotor stimulants, sedatives, tranquilizers and sedative-level dosages of tranquilizers, etc., as well as buffers and usual pharmaceutical carriers or diluents. Examples of some of these drugs are phenobarbital, sodium phenobarbital, meprobamate, chlordiazepoxide hydrochloride, butaperazine, methamphetamine, amphetamine, dextroamphetamine.

Although very small quantities of the active materials of the present invention are effective when minor therapy is involved or in cases of administration to subjects having a relatively low body weight, unit dosages are usually from five milligrams or above and preferably 25, 50, or 100 milligrams or even higher, depending, of course, upon the emergency of the situation and the particular result desired. Five to 50 milligrams appears optimum per unit dose or usual broader ranges appear to be one to 500 milligrams per unit dose. Daily dosages should preferably range from 10 mg. to 100 mg. The active ingredients of the invention may be combined with other pharmacologically active agents as stated above. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages will, of course, be determined according to standard medical principles under the direction of a physician or veterinarian.

The following formulations are representative for all of the pharmacologically active compounds of this invention.

FORMULATIONS

1. Capsules

Capsules of 10 mg., 25 mg. and 50 mg. of active ingredient per capsule are prepared. With the higher amounts of active ingredient, reduction may be made in the amount of lactose.

| Typical blend for encapsulation | Per Capsule, mg. |
| --- | --- |
| Active ingredient, as salt | 10 |
| Lactose | 259 |
| Starch | 126 |
| Magnesium Stearate | 4 |
| Total | 399 |

Additional capsule formulations preferably contain a higher dosage of active ingredient and are as follows:

| Ingredients | 100 mg. per Capsule | 250 mg. per Capsule | 500 mg. per Capsule |
| --- | --- | --- | --- |
| Active ingredient, as salt | 100 | 250 | 500 |
| Lactose | 214 | 163 | 95 |
| Starch | 81 | 81 | 47 |
| Magnesium Stearate | 4 | 6 | 8 |
| Total | 399 | 500 | 650 |

In each case, uniformly blend the selected active ingredient with lactose, starch, and magnesium stearate and encapsulate the blend.

2. Tablets

A typical formulation for a tablet containing 10.0 mg. of active ingredient per tablet follows. The formulation may be used for other strengths of active ingredient by adjustment of weight of dicalcium phosphate.

| | Per Tablet, mg. |
| --- | --- |
| 1. Active ingredient | 10.0 |
| 2. Corn starch | 15.0 |
| 3. Corn starch (paste) | 12.0 |
| 4. Lactose | 35.0 |
| 5. Dicalcium phosphate | 132.0 |
| 6. Calcium stearate | 2.0 |
| Total | 206.0 |

Uniformly blend 1, 2, 4 and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

What I claim is:

1. A compound selected from dibenz[b,f]azocin-6(5H)-ones having the formula:

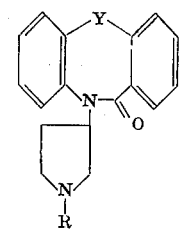

wherein;
R is selected from the group consisting of hydrogen, lower-alkyl and phenyllower-alkyl,
Y is selected from —CH$_2$—CH$_2$— and —CH CH, and non-toxic pharmaceutically acceptable acid addition salts thereof.

2. A compound of claim 1, which is 5-(1-benzyl-3-pyrrolidinyl)-11,12-dihydrodibenz[b,f]azocin-6(5H)-one.

3. A compound of claim 1, which is 5-(1-methyl-3-pyrrolidinyl)-11,12-dihydrodibenz[b,f]azocin-6(5H)-one.

4. A compound of claim 1, which is 11,12-dihydro-5-(3-pyrrolidinyl)dibenz[b,f]azocin-6(5H)-one.

* * * * *

UNITED STATES PATENT OFFICE
CERTIFICATE OF CORRECTION

Patent No. 3,676,432                    Dated July 11, 1972

Inventor(s) Grover Cleveland Helsley

It is certified that error appears in the above-identified patent and that said Letters Patent are hereby corrected as shown below:

In the abstract, change "dehydro)dibenz[b,fe[azocin-6" to read --dehydro)dibenz[b,f]azocin-6--

Column 1, line 2, change "[b,fe]" to --[b,f]--

Column 3, line 8, change "11,12-dihydrodibenz[ ]azocin" to read --11,12-dihydrodibenz[b,f]azocin--

Column 4, line 18, change "[b,f]6(5H-" to read --[b,f]azocin-6(5H)--; line 66, insert -6 after azocin and before (5H)--

Column 6, line 56, change to read --Y is selected from -CH₂-CH₂- and -CH=CH, and--

Signed and sealed this 9th day of January 1973.

(SEAL)
Attest:

EDWARD M. FLETCHER, JR.
Attesting Officer

ROBERT GOTTSCHALK
Commissioner of Patents